US012676090B2

(12) United States Patent
Oosthoek et al.

(10) Patent No.: US 12,676,090 B2
(45) Date of Patent: Jul. 7, 2026

(54) ELECTRONIC SHELF LABEL AND SHELF ILLUMINATION DEVICES

(71) Applicant: VusionGroup GmbH, Fernitz-Mellach (AT)

(72) Inventors: Jan Oosthoek, Voitsberg (AT); Philipp Jauck, Fernitz-Mellach (AT)

(73) Assignee: VusionGroup GmbH, Fernitz-Mellach (AT)

( * ) Notice: Subject to any disclaimer, the term of this patent is extended or adjusted under 35 U.S.C. 154(b) by 0 days.

(21) Appl. No.: 18/741,421

(22) Filed: Jun. 12, 2024

(65) Prior Publication Data

US 2024/0331581 A1 Oct. 3, 2024

Related U.S. Application Data

(63) Continuation of application No. 17/422,180, filed as application No. PCT/EP2019/050722 on Jan. 12, 2019, now Pat. No. 12,046,163.

(51) Int. Cl.
*G09F 3/20* (2006.01)
*A47F 5/00* (2006.01)
(Continued)

(52) U.S. Cl.
CPC ............ *G09F 3/208* (2013.01); *A47F 5/0068* (2013.01); *F21V 23/003* (2013.01);
(Continued)

(58) Field of Classification Search
CPC .......... G09F 3/208; G09F 9/30; A47F 5/0068; F21V 23/003; F21V 33/0012; F21Y 2115/10
(Continued)

(56) References Cited

U.S. PATENT DOCUMENTS

2011/0204009 A1 8/2011 Karan
2012/0286698 A1 11/2012 Pas
(Continued)

FOREIGN PATENT DOCUMENTS

JP 2014167699 A * 9/2014
KR 10-2015-0131342 A 11/2015
(Continued)

OTHER PUBLICATIONS

English Translation of WO 2018/124397 A1 of Sohn Hee-Jung et al., (Year: 2018).*
(Continued)

*Primary Examiner* — James R Greece
*Assistant Examiner* — Hana S Featherly
(74) *Attorney, Agent, or Firm* — Studebaker Brackett PLLC

(57) ABSTRACT

An electronic shelf label, which is arranged to be attached to a shelf, preferred to a shelf rail located at the front edge of a shelf floor, more preferred to form the shelf rail by itself and to be directly attached to the shelf floor, the electronic shelf label comprises: a display screen arranged on or as the front wall of the electronic shelf label to display content in the form of a still or video image, the display screen comprises a light source to provide a backlit for the display screen, and an illumination device, which is independently controllable form the light source and arranged to emit light from the electronic shelf label from a different wall than its front wall.

15 Claims, 4 Drawing Sheets

(51) Int. Cl.

| | |
|---|---|
| ***F21V 23/00*** | (2015.01) |
| ***F21V 33/00*** | (2006.01) |
| ***F21Y 115/10*** | (2016.01) |
| ***G09F 9/30*** | (2006.01) |

(52) U.S. Cl.
CPC ............ *F21V 33/0012* (2013.01); *G09F 9/30* (2013.01); *F21Y 2115/10* (2016.08)

(58) Field of Classification Search
USPC .......................................................... 362/127
See application file for complete search history.

(56) References Cited

U.S. PATENT DOCUMENTS

| | | | | |
|---|---|---|---|---|
| 2016/0132822 | A1* | 5/2016 | Swafford | ................ H04W 4/80 705/28 |
| 2016/0134930 | A1 | 5/2016 | Swafford | |
| 2018/0027995 | A1 | 2/2018 | Vieville | |

FOREIGN PATENT DOCUMENTS

| | | | | |
|---|---|---|---|---|
| KR | 10-2017-0112739 A | 10/2017 | | |
| KR | 10-2018-0008678 A | 1/2018 | | |
| KR | 10-2018-0070164 A | 6/2018 | | |
| WO | WO-2018124397 A1 * | 7/2018 | | ............. G01C 21/20 |

OTHER PUBLICATIONS

English translation of JP 2014/167699 A1 of Murakami Tomotaka (Year: 2014).*

An Office Action mailed by China National Intellectual Property Administration on Jun. 18, 2024, which corresponds to Chinese Patent Application No. 201980088692.0 and is related to U.S. Appl. No. 18/741,421.

An Office Action mailed by the Korean Intellectual Property Office on Jul. 3, 2024, which corresponds to Korean Patent Application No. 10-2021-7022919 and is related to U.S. Appl. No. 18/741,421.

A Notice of Allowance mailed by the Korean Intellectual Property Office on Feb. 1, 2024, which corresponds to Korean Patent Application No. 10-2021-7022919 and is related to U.S. Appl. No. 18/741,421.

An Examination Report mailed by the Australian Patent Office on Nov. 1, 2023, which corresponds to Australian Patent Application NO. 2019419905 and is related to U.S. Appl. No. 18/741,421.

A Notice of Acceptance mailed by the Australian Patent Office on Feb. 28, 2024, which corresponds to Australian Patent Application No. 2019419905 and is related to U.S. Appl. No. 18/741,421.

Communication pursuant to Article 94(3) EPC issued by the European Patent Office on Jul. 1, 2024 , which corresponds to European Patent Application No. 1970111-2-1218 and is related to U.S. Appl. No. 18/741,421.

An Office Action mailed by China National Intellectual Property Administration on Mar. 24, 2025, which corresponds to Chinese Patent Application No. 201980088692.0 and is related to U.S. Appl. No. 18/741,421.

* cited by examiner

ELECTRONIC SHELF LABEL AND SHELF ILLUMINATION DEVICES

CROSS-REFERENCE TO RELATED APPLICATIONS

This application is a Continuation of U.S. patent application Ser. No. 17/422,180 filed Jul. 10, 2021, which is the U.S. National Stage of International Application No. PCT/EP2019/050722 filed Jan. 12, 2019, the entire contents of which are incorporated herein by reference.

TECHNICAL FIELD

The invention relates to a device for shelf illumination.

BACKGROUND

A known system comprising an electronic shelf illumination device and a control device for controlling shelf illumination device is known from the Korean patent application KR 20180070164 (A). The application discloses an illumination device that is disposed on the ceiling of the store and a controller for controlling the illumination device.

Mounting the illumination device on the ceiling shows some significant disadvantages, which may be shadow effects caused by the shelf structure or by customers standing in front of a shelf or walking along a shelf. But also focusing the light beam emitted from the illumination device on certain products or product groups is difficult or even impossible as the light beam is typically round shaped while products or product groups are typically arranged on the shelf/shelfs in a rectangular manner. In this context, the light beam generated typically lacks in terms of variability, e.g. in regard to its diameter or its orientation or its shape, as well as its demarcation from the non-illuminated environment or that environment that shall not be illuminated. These deficiencies can only be overcome by the installation of expensive illumination devices and also expensive control devices, which are e.g. used in theaters. The operation of such an equipment however requires certain user skills which are seldom available at the retailer's shop. Equipping the entire shelf-structure of a retail shop with such a technology would therefore certainly contradict retail shop operator's cost requirements. Typically, relatively cheap equipment is demanded. Finally, also the operation of such an equipment should be easy, preferred automatic, and cheap. Cost optimization is in particular demanded with regard to energy consumption, which accumulates expanse over the entire lifetime of the equipment, but also with regard to one-time installation, recurring maintenance, and labour cost.

The object of the invention is to provide an electronic shelf illumination device that avoids the problems discussed above.

SUMMARY OF THE INVENTION

This object is achieved by a system according to claim 1. Therefore, the subject matter of the invention is an electronic shelf label, which is arranged to be attached to a shelf, preferred to a shelf rail located at the front edge of a shelf floor, more preferred to form the shelf rail by itself and to be directly attached to the shelf floor, the electronic shelf label comprises a display screen arranged on or as the front wall of the electronic shelf label to display content in the form of a still or video image, the display screen comprises a light source to provide a backlit for the display screen, and an illumination device, which is independently controllable form the light source and arranged to emit light from the electronic shelf label from a different wall than its front wall.

The object is also achieved according to claim 6. Therefore, the subject matter of the invention is a merchandising system that comprises two neighboring shelf floors which are arranged one above the other leaving space free in-between to display goods on at least the lower one of the two neighboring shelf floors, and each shelf floor is equipped with an electronic shelf label according to one of the preceding claims 1 to 5, and the electronic shelf labels are aligned in a row one above the other.

The object is also achieved according to claim 13. Therefore, the subject matter of the invention is a method for illuminating the space between two neighboring shelf floors which are arranged one above the other leaving space free in-between to display goods on at least the lower one of the two neighboring shelf floors, wherein at least the upper shelf floor is equipped with an electronic shelf label, which is attached to a shelf, preferred attached to a shelf rail located at the front edge of a shelf floor, more preferred the electronic shelf label forms the shelf rail by itself and is directly attached to the shelf floor, the method comprises the steps of controlling an illumination device of the electronic shelf label independently from a light source of a display screen of the electronic shelf label, wherein the display screen is located on the front wall or realizes the front wall of the electronic shelf label and is used to display content in the form of a still or video image, and wherein the light source provides the backlit for the display screen, and the illumination device is arranged to emit light from the electronic shelf label from a different wall than the front wall of the electronic shelf label into the space between the two shelf floors.

The measures according to the invention provide a number of advantages, which are (listed in a non-exhaustive manner):

- Shadow effects caused by customers passing by along the shelfs or standing in front of the shelfs are entirely avoided because the illumination device is integrated into the structure of the electronic shelf label that is attached to the front edge of shelf floor. In this location the electronic shelf label is positioned exactly above and even slightly in front of the goods, which are placed on the next shelf floor below the one on which the electronic shelf label is affixed. Hence perfect illumination of the goods is achieved.
- Focusing of a light beam over longer distances or even demarcation from areas that shall not be illuminated is not any longer an issue or even no longer a requirement because of the proximity between the electronic shelf label and the goods to be illuminated. Rather, it is sufficient if the product is illuminated areally with light.
- Initial installation expenses are significantly reduced because no double infrastructure (one for the illumination and one for the electronic shelf label operation) is any more required. Instead only one infrastructure must be installed, which is the infrastructure of the electronic shelf labels.
- Consequently, also maintenance costs are reduced by the proportion of the avoided separate illumination installation. Maintenance expenses will only be incurred by the infrastructure of the electronic shelf labels.
- But also, the variability or flexibility of illumination possibilities itself is dramatically improved.

This relates on the one hand to the illumination of the products which can be freely adjusted (e.g. with regard to light intensity or light color or modulation of the mentioned parameter in time).

This also relates on the other hand to further effects achievable by the total sum of illumination devices integrated into the total sum of electronic shelf labels installed in the entire retail shop. In particular background illumination or illumination of the entire store during closing hours is easily achievable. Further to this, such a (off-operation hour) illumination for a retail store can be realized by extremely low power consumption, in particular by means of relatively low power consuming application of illumination devices, e.g. LEDs. In fact, the illumination devices can be operated independently from the display screen, in particular independently from its relatively bright light producing light source that also heavily consumes energy during operation. "Can be operated independently" herein refers also to an operation mode in which the display screen including its light source is entirely switched off. What remains in operation is only the illumination device, e.g. in a heavily or variable dimmed operation mode that is extreme low power consuming. Also, only operating a fraction of the installed electronic shelfs labels in such a mode while the remaining electronic shelf labels are switched off will further reduce the power consumption. This in total will lead to long lasting and sustainable energy saving effects in the operation of the retail store. The sum of electronic shelf labels for which the illumination device is used to illuminate the shop according to the above said realizes a backlight illumination system for a retail shop.

Further to this, pulsing the intensity or changing the color over all illumination devices synchronously or sequentially for groups of the illumination devices will lead to eye-catching effects and triggers the attention of potential customers, who are passing by the shop.

The individual illumination devices, which can all be individually controlled-on the one hand individual with regard to the content shown on the video screen of the electronic shelf label to which it belongs, but also on the other hand individual from each other—can also be used to highlight a certain product or a group of products over others by generating special illumination effects for the particular product or group of products. For example, also color codes can be assigned to certain classes of products. Here it would be possible to use red for meat-based products or white for cleaning supplies. Operating the sum of illumination devices installed on one particular shelf having a number of shelf floors (e.g. 6) and extending along a certain width (e.g. 5 meters) will lead to a precisely spatially delimited visual indicator for customers in the retailer's shop. The entire shelf with all its products placed in it will appear as color wall or structure with a relatively high degree of visual impact or attraction for product groups or certain offers in the retailer's shop.

Furthermore, it would also be possible along a shelf floor with perishable products to equip all or only some of the individual lighting devices as ultra-violet light sources (e.g. UV-LEDs). This would have a disinfecting effect and could extend the shelf life of perishable products.

The sum of illumination devices installed in the retailer's shop can also be used to mark the way towards a certain shelf or product. This feature can be achieved by having switched on only those illumination devices aligned in a row which indicate the way to follow. This feature can also be achieved by consecutively switching on and off the illumination devices aligned in a row. Also, a group of flashing illumination devices or just glowing at one point of the store can be used to highlight a section of a shelf or a whole shelf line.

This mode of operation may be helpful for customers to locate a certain product. This mode of operation may also be helpful for employees of the retail shop, e.g. to be guided immediately to a shelf which needs action by the employee. Those positions in a shelf which are empty can be illuminated e.g. with a specific color code to make it easier for the staff to find. The confirmation of the filling/re-stocking of the position can be communicated to the ESL concerned via its user interface. For example, an employee's touch or NFC communication with an employee's NFC-enabled device may be used. Thereafter, a normal illumination of the relevant position takes place again.

However, it is also possible to use a special type of light which does not disturb the normal customer or is not recognizable to him. Such a light may be, for example, a UV light or a polarized light. For the employee, however, this special light can be seen with the help of glasses or any other device to detect light sources that are not visible to the human eye. Such a device (e.g. smartphone or tablet computer or the like) may have light sensors and execute an application that guised the way by measuring/detecting the light via the light sensors. Of course, this type of lighting can also be used for other management tasks. This includes, for example, the display of a position where there are expired products that need to be removed from the shelf, and so on.

In addition, the highlighting of positions on a shelf by special light (visible color code/color sequences/light that is visible only with special glasses/ . . . ) can also be used as an orientation or navigation support for a retailer's employees (in-store picker) preparing the shopping basket for customers.

But also, the way to an emergency exit can be marked by the aid of such an operation mode.

In summary, dependent on the application chosen, the electronic shelf label itself realizes a shelf illumination device or a shop illumination device or a floor illumination device.

Further particularly advantageous embodiments and extensions of the invention arise from the dependent claims and the following description. It should be noted that certain features of a claim category can be transferred with appropriate adaptation to the other categories and achieve the same effects there. Furthermore, it should be understood that the use of the phase " . . . arranged to . . . " shall be understood to introduce a mechanical, structural, or a certain technical feature, a technical feature formulated in a functional way, or also a technical design, e.g. realized by means of computer or electronics hardware, or even a software based feature in the context of a computer implemented invention, which is based on a program code that is executed on a programmable computer hardware in order to achieve a certain function or effect.

The content that is displayed by the ESL can be any type of advertisement and/or product specific information like price information or product description or the like.

Beside the applications and embodiments mentioned above in the context of the particular feature of an independently controllable illumination device as such, the electronic shelf label further comprises an illumination-controller device. The illumination-controller device is arranged to control the light emittance of the illumination device dependent on the content displayed on the display screen of the electronic shelf label. This is achieved by processing content-information, which describes the content displayed on its own display screen. This feature allows to align color or intensity of the light used to illuminate to be adjusted in similarity to the content displayed by the display screen.

According to a further, in particular preferred, embodiment the electronic shelf label comprises an interface to establish a data link with at least another electronic shelf label, when it is coupled to said interface, and the illumination-controller device is arranged to acquire content-information from the other electronic shelf label, when it is coupled to said interface. Again, the content-information describes the content displayed, but in this case displayed by the display device of the other electronic shelf label. Therefore, the acquired content-information is related to the content displayed by the other electronic shelf label. Advantageously, the illumination-controller device is arranged to control the light emittance of the illumination device dependent on the received content-information.

The content-information is created by analyzing the played back image. This is performed within the respective electronic shelf label, either by the illumination-controller device or by a playback-controller device, used to control the playback within the electronic shelf label, or by a separate dedicated device. In particular, the dominating color tone and/or the denominating brightness of the played back image is computed along the width of the display screen. This can be performed with the desired granularity, which should correspond to the technical parameters of the illumination device.

If the illumination device uses the content information of the played back image of its own display screen the content information is established for the lower part of the image displayed by the display screen because this part of the image is close to the position of the illumination device. By doing so, the illumination device can produce light that has a similar color tone or brightness as the lower part of the played back image has. The content information established thereby is than represented by content information data and either processed within the electronic shelf label or submitted to the other electronic shelf label via said interface.

If the illumination device installed in the electronic shelf label uses the content information of the image played back by the display screen of the electronic shelf label installed beneath the electronic shelf label in which it is installed, the content information is established for the upper part of the image displayed. This part of the image is close to the position of the illumination device installed in the electronic shelf label above the one that contains the display screen. By doing so, the illumination device of the upper electronic shelf label can produce light that has a similar color tone or brightness as the upper part of the image played back on the display screen of the lower electronic shelf label.

However, according to a further embodiment it is possible that the upper one of the two electronic shelf labels knows about the image played back by the lower electronic shelf label. This may be achieved by submission of image data concerned not only to the lower electronic shelf label but also to the upper electronic shelf label. In this scenario the upper electronic shelf label is enabled to analyze the image played back by the lower electronic shelf label by itself and control its own illumination device without any data exchange with the lower electronic shelf label. However, synchronism in the playback of the both images by the two electronic shelf labels is a crucial point in this operation.

These features are of particular importance for a system in which for instance the playback of a single video is distributed across multiple electronic shelf labels, and each electronic shelf label only plays one section of the video image, with the playback between the electronic shelf labels being synchronized. The different electronic shelf labels know about the respective playback status by exchanging the respective playback status in the group of the electronic shelf labels, for example via a bus system or a radio communication link. The playback status is used in the group of the electronic shelf label for synchronization, without the intervention of an external instance, such as a server.

In general, the illumination device can be realized in various ways. For example, it is possible to realize it as an Organic Light Emitting Diode (OLED) stripe or even as an OLED display. However, taking the relatively high price of such OLEDs into consideration, it is of advantage that the illumination device is realized as an LCD display or, even more cost efficient, an LED light bar that comprises a number of, preferred read green blue (RGB), LEDs arranged in a row, preferred positioned equidistant from each other along its length, and the illumination-controller device is coupled to the LED light bar and arranged such that each of the LEDs is individually controllable and/or groups of LEDs are group-wise controllable along its length. Such different embodiments of the illumination device may extend along the entire width of the electronic shelf label or in a less preferred embodiment only along a fraction of said width.

Dependent on the particular application of the electronic shelf label, the illumination device may be arranged to emit its light from any other wall of the electronic shelf label display than the front wall.

According to the preferred embodiment, the electronic shelf label comprises a rear wall and a bottom wall, and the illumination device is arranged on or integrated into or realizes the bottom wall, and the illumination device is arranged to emit its light from the electronic shelf label from the bottom wall, preferred in a direction perpendicular with respect to the bottom wall, more preferred in a direction slightly tilted away from the plane of the front wall in direction of the plane of the rear wall. As a result, the electronic shelf label is perfect for illuminating areas that are either directly below or below it and slightly offset to the rear, as is the case with merchandise positioned on a shelf below the electronic shelf label. If the illumination device is installed of the plane of the bottom wall, its dominant illumination direction is typically perpendicular to the plane of the bottom wall. Around this dominant illumination direction, of course, the area of illumination widens conically, the further one is away from the illumination device. Hence the bottom wall may be either oriented perpendicular with regard to the front wall or slightly tilted backwardly to form an acute angle between the front wall and the bottom wall. However, this may also be achieved by having front wall and bottom wall oriented with an angle of 90° therebetween, while the installation plane of the illumination device deviates from the plane of the bottom wall, so that an acute angel is formed between the plane of the illumination device and the front wall.

This embodiment is of particular interest, if the electronic shelf label is used in an inventive merchandising system. Such a merchandising system comprises (at least) two neighboring shelf floors which are arranged one above the other leaving space free in-between to display goods on at least the lower one of the two neighboring shelf floors, and each shelf floor is equipped with an electronic shelf label according to the invention and the electronic shelf labels are aligned in a row one above the other. In this configuration the electronic shelf label installed on the upper shelf floor can perfectly illuminate the shelf floor beneath it or products displayed on this shelf floor.

The merchandising system may further comprise a distribution server to digitally distribute an entire set of still images or an entire video film to each of the electronic shelf labels. In order to process the set of still images or the entire video film independent from the server (without any bidirectional communication or the reception of any synchronization signals form the server or the like) the electronic shelf labels are arranged to digitally store the entire set of still image or the entire video film, and, after the distribution was accomplished, to start playback in synchronism with each other and to maintain synchronism with each other during the playback of the still images of the set of still images or video images of the video film.

This may be performed according to the measures explained on pages 2 to 8 of the text of the international patent application PCT/EP2017/078844, as originally filed on 10 Nov. 2017, which are incorporated by reference herein.

The way how playback is performed depends on the particular application of the merchandising systems. It is basically possible to playback the same still image or video image on all display screens. In order to cope with various applications and different scenarios making use of all involved display screens to play back the entire still image or the entire video image distributed in image sections over the number of display screens each electronic shelf label comprises a playback-controller device that is coupled with the display screen or is part of the display screen. The embodiment of the playback-controller device is such that it is arranged to playback an image section of the entire still image or entire video image, preferred said image section is pre-defined, more preferred said image section is individual for each of the electronic shelf labels. This allows to display still image stripes or video image stripes on different display screens such that these individual stripes assemble the entire still image or the entire video image. It also allows to show different stripes of still images or video images on different display screens, wherein other intervening image stripes or other video stripes which together with the displayed image or video stripes assemble the entire still image or video image are blanked out.

Further to this the at least two electronic shelf labels are coupled with each other by means of the motioned interface.

In particular according to the configuration of the inventive merchandising system the illumination-controller device of the electronic shelf label attached to the upper shelf floor is arranged to acquire content-information related to the content displayed on the electronic shelf label attached to the lower shelf floor via the interface, and is arranged to control the light emittance of its illumination device (this is the illumination device that is controlled by the illumination-controller within the electronic shelf label) dependent on the received content-information. Based on its upper positioning in the relation of the two electronic shelf labels it illuminates the space beneath its illumination device, which is either the empty shelf floor or the product placed on the shelf floor, in the context of the content played back.

In particular, the illumination-controller device of the electronic shelf label attached to the upper shelf floor is arranged to control the intensity and/or the color of the light emitted by the illumination device such that the emitted light interpolates the intensity and/or the color of the light between the image played back on the electronic shelf label attached to the upper shelf floor and the image played back on the electronic shelf label attached to the lower shelf floor. This allows to visually narrow, hide or close the physical gap between the two display screens, which means also between the two shelf floors stacked over each other to which the electronic shelf labels are attached. This effect is achieved by illuminating the gap with light having an intensity context and/or color context with the image played back. In terms of customer perception, the illumination leads to best visual match of the image gap between the individual image sections shown on the two display screens of the neighboring electronic shelf labels.

There are different possibilities regarding the granularity or complexity of the illumination of the gap between the display screens.

According to a less complex embodiment the illumination-controller device of the electronic shelf label attached to the upper shelf floor is arranged to establish the interpolation for the entire width of the display screen. This means only one parameter is used to describe either intensity or color or even both of them.

In a more advanced embodiment the illumination controller device of the electronic shelf label attached to the upper shelf floor is arranged to establish a number of interpolations along the entire width of the display screen, wherein a threshold of change in intensity or color of the image displayed is used to discriminate width entities along the entire display screen for which an individual interpolation is established and applied to control the light emission of spatially corresponding sections of the illumination device. This allows to generate a finer course of the light intensity and/or hue of the emitted light along the screen.

In the most advanced embodiment the illumination-controller device of the electronic shelf label attached to the upper shelf floor is arranged to establish an individual interpolation for each light emitting element of the illumination device, preferred for that part of the display screen that spatially corresponds to the position of the individual light emitting element along the width of the display screen. Here the highest degree of granularity for the generation of the illumination light is used. The granularity in fact is defined by the number of light emitting elements of the illumination device along the width of the display screen and/or the distance between such light emitting elements of the illumination device.

The features of the invention may be realized by means of pure hardware or of programmable hardware on which a software is executed, e.g. microprocessors, microcontrollers or application specific circuits with memory devices to store the software and/or operational data are to be considered.

The electronic shelf labels and their display screens are supplied with electric power by means of a centralized power supply or distributed power supplies. Electric power is supplied by means of cables. Also, battery powered systems are possible.

These and other aspects of the invention are obtained from the figures discussed below.

BRIEF DESCRIPTION OF THE FIGURES

The invention is explained again hereafter with reference to the attached figures and on the basis of exemplary embodiments, which nevertheless do not limit the scope of the invention. In the different figures the same components are labelled with identical reference numbers. They show in schematic fashion in.

DESCRIPTION OF THE EXEMPLARY EMBODIMENTS

Figure 1:
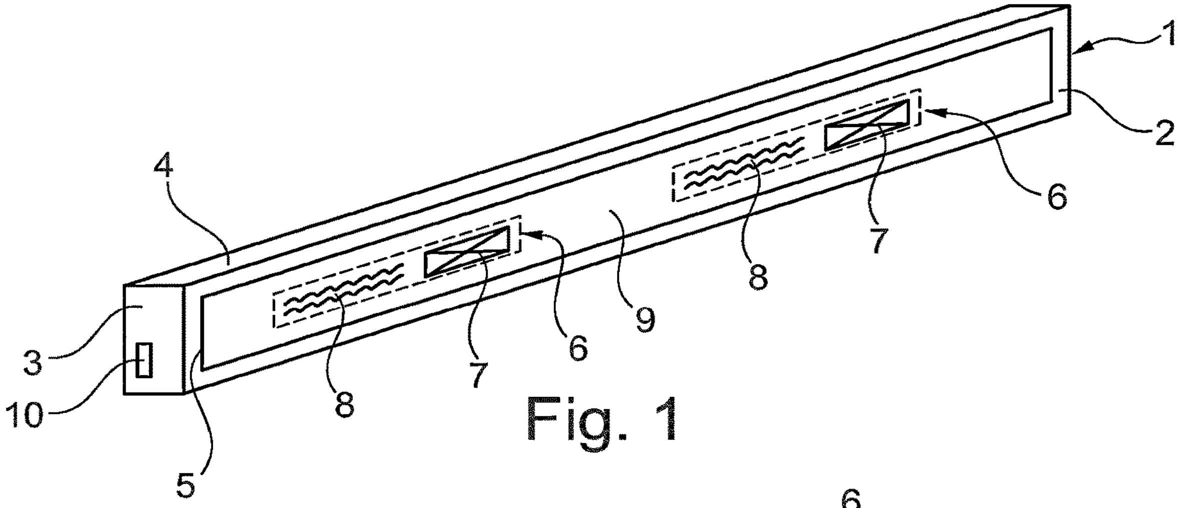
FIG. 1-3 an electronic shelf label in three perspectives.

FIG. 1 shows an electronic shelf label 1 indicated as ESL 1 from hereon, of which a front wall 2, a left side wall 3 and a top wall 4 is visible. The front wall 2 shows a display screen 5 used to display a virtual price tag 6. The display screen 5 is realized as an LCD display. The virtual price tag 6 shows price information 7, which is indicated by a rectangular field with a cross in it, and product information 8, which is indicated by wave lines. The ESL 1 shows the virtual price tag 6 in a picture in picture mode covering a background image 9 (not shown in detail here, but see FIG. 7 for details), which may be a still imager or a video image. For the sake of clarity, it is to mention that the virtual price tag 6 and the background image are only displayed in operation of the ESL 1. The ESL 1 further shows connectors (not shown in detail) of a wire-based interface 10 (see FIG. 4 for more details). The wire-based interface 10 allows the supply of electric power. It may also allow data communication either by means of a serial or parallel data bus.

Figure 2:
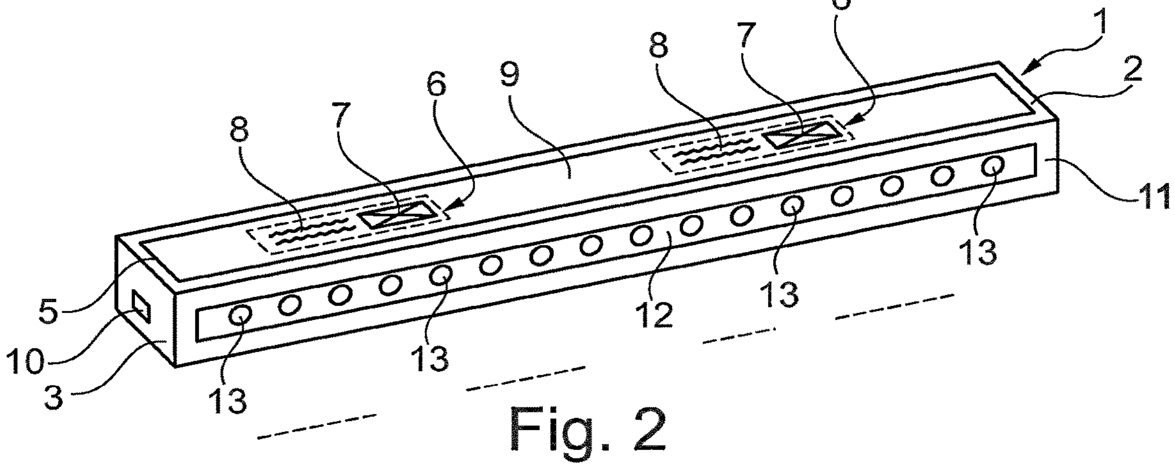

FIG. 2 shows the ESL 1 in slightly upwardly tilted perceptive when compared with FIG. 1. In this perspective a bottom wall 11 is visible. The bottom wall 11 shows an illumination device 12 for illumination of objects positioned beneath the ELS 1 (see e.g. FIGS. 5, 6 and 7. The illumination device 12 is realized as an RGB-LED light bar for producing light in the visible spectrum. Small circles along the length of light bar indicate the individual RGB-LEDs 13.

Figure 3:
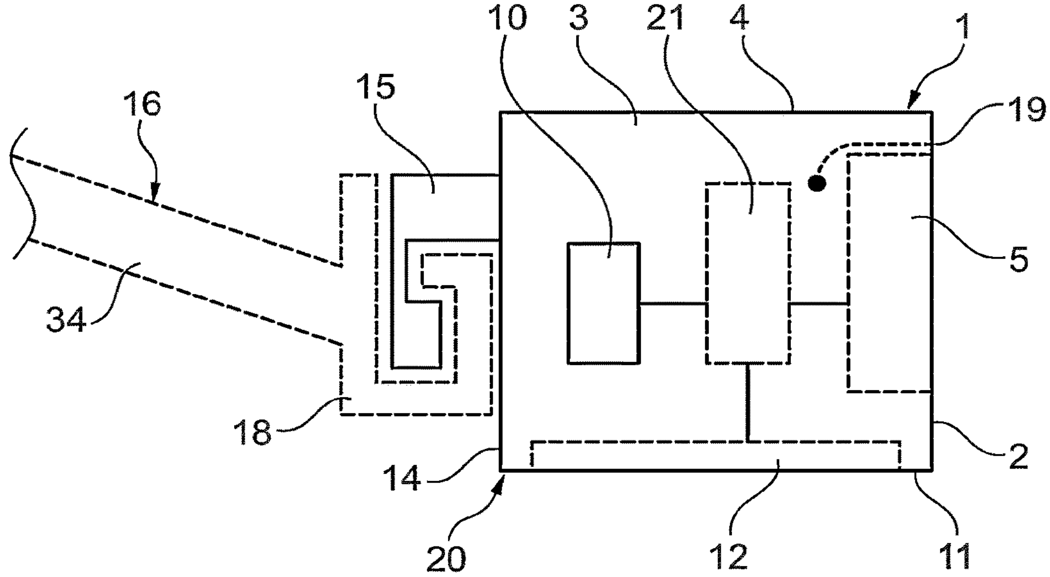

FIG. 3 shows the ESL 1 from its left side. In this perspective a rear wall 14 of the ESL 1 is also indicated. The rear wall 14 comprises a mechanical coupling arrangement 15 for attaching the ESL 1 to a shelf 16, of which only a shelf floor 17 and a shelf rail 18 showing a corresponding coupling arrangement is displayed. In this illustration the coupling arrangements are realized as a rail-like sliding mechanism. However, also other coupling means like snap-in mechanism or screw-based coupling and the like is possible.

The mentioned walls 2, 3, 4, 11, 14 together with a right side wall 19 form a housing 20 of the ESL 1.

Further to this, FIG. 3 also shows an electronic circuit 21, which is hosted inside the housing 20 of the ESL 1.

Figure 4:
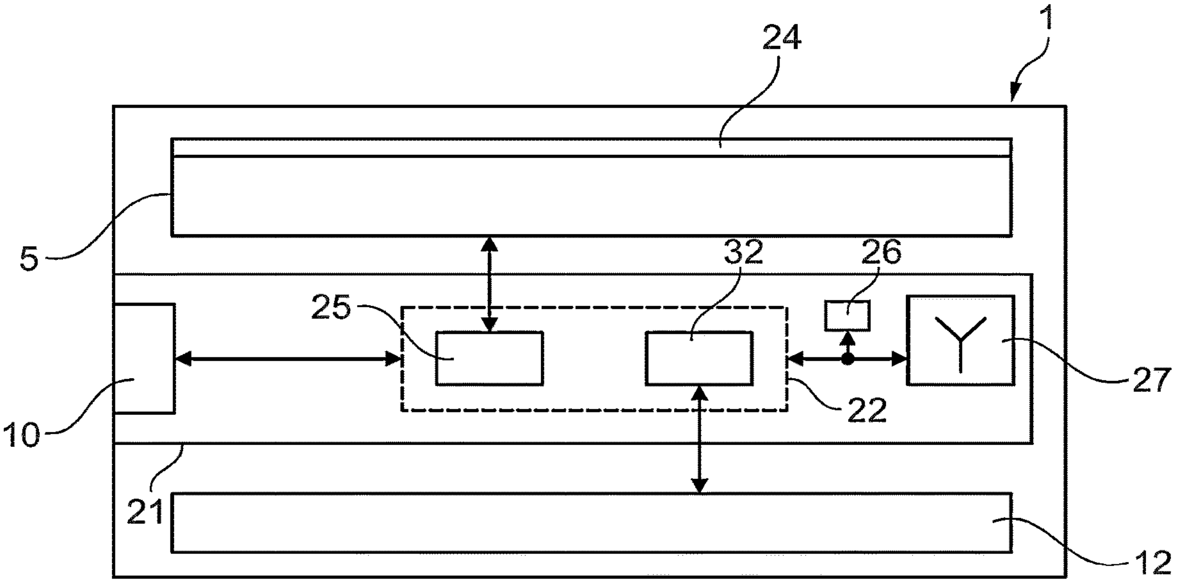
FIG. 4 a block diagram of electronic components of the electronic shelf label.

FIG. 4 now shows more details of the electronic components of the ESL 1. The electronic circuit 21 comprises a programmable device in the form of a micro-controller 22, which is coupled to the illumination device 12 and the display screen 5. Beside its LCD panel 23 the display screen 5 further comprises a light source 24 for producing the backlit required for the operation of the LCD panel 23.

A first software that is executed on the micro-controller 21 realizes a playback-controller device 25. The playback-controller device 25 controls the playback of a video film via the display screen 5. The video film is stored in form of video data by a memory device 26 (EEPROM) accessible by the micro-controller 22.

Figure 5:
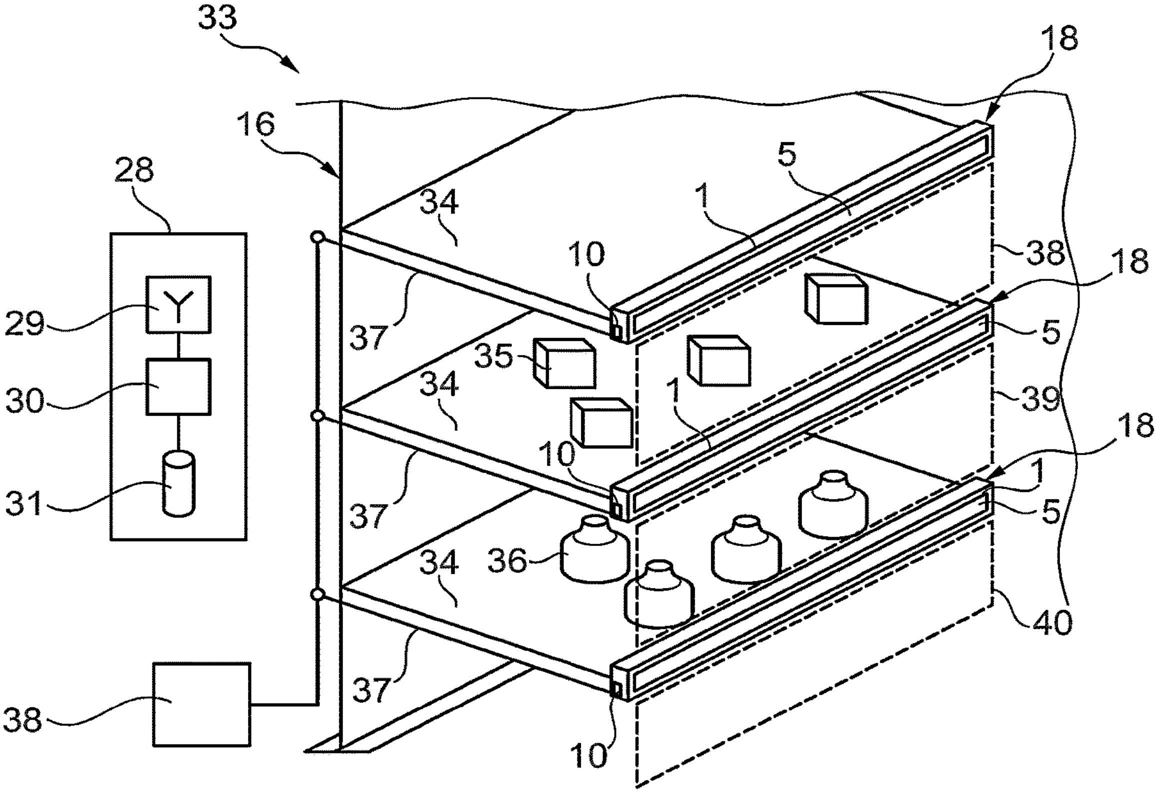
FIG. 5 a first embodiment of a merchandising system with a number of such electronic shelf labels.

The electronic circuit 21 further comprises a first radio communication interface 27. The radio communication interface 27 allows to receive video data of the entire video film from a distribution server 28, which is shown in FIG. 5. It also allows communication between different ESLs 1.

The distribution server 28 comprises a second radio communication interface 29, a processing device 30, which may be a microprocessor-based motherboard running a software on it to provide the functions of the distribution server 28, like the radio-based distribution of the video film to all ESLs 1 installed in a retail shop. The processing device is coupled to a storage device 31 which stores amongst various operational data also the video data of the video film. Focusing now again on FIG. 4, a second software that is executed on the micro-controller 21 realizes an illumination-controller device 32. The illumination-controller device 32 controls the light generated by the RGB-LEDs of the illumination device independent from the light source 24 of the display screen 5.

FIG. 5 shows a merchandising system 32, which makes use of the ESLs 1. In the merchandising system 33 a number of neighboring shelf floors 34 which are arranged one above the other leaving space free in-between are equipped with one ESL 1 each. Different types of goods 35, 36 are placed on the shelf floors 33. Each of the wire-based interfaces 10 is connected by wires 37, which are guided along the structure of the shelf 16, with a central power supply 38 of the ESLs 1.

In operation, after having accomplished the download of the video film from the distribution server 28, the ESLs 1 start the video film playback. If each ESLs 1 was supplied with an individual film, these films may be played back independent from each other. If only one and the same film was distributed to the ESLs 1, they play back the film in synchronism with each other. Synchronous start of playback and maintained synchronism during playback in the group of the ESLs 1 is achieved by means of radio communication between the ESLs 1 via the radio-communication interface 27.

Independent from the light sources 24 of the display screens 5 of the ESLs 1, the individual illumination devices 12 are now operated to illuminate the space beneath the respective ESL 1. For example, this can be done as follows:

- the space beneath the upper most ESL 1 and the ESL 1 attached to the middle shelf 33 (indicated by rectangle 38) is illuminated with light of green color, e.g. to indicate organic products;
- the space between the ESL 1 attached to the middle shelf 34 and the lower most shelf 34 (indicated by rectangle 39) is illuminated with light of red color, e.g. to indicate spicy products; and
- the floor beneath the lower most shelf floor 34 (indicated by rectangle 40) is illuminated with bright white light, e.g. to make the floor beneath the lowest shelf floor 34 shine.

The individual illumination-controller devices 32 receive their commands control for setting the appropriate light color and/or brightness of the light to be generated from a central shop management server, e.g. from the distribution server 28, that may also be used to manage inventory and stores the planogram of the retail shop.

Figure 6:
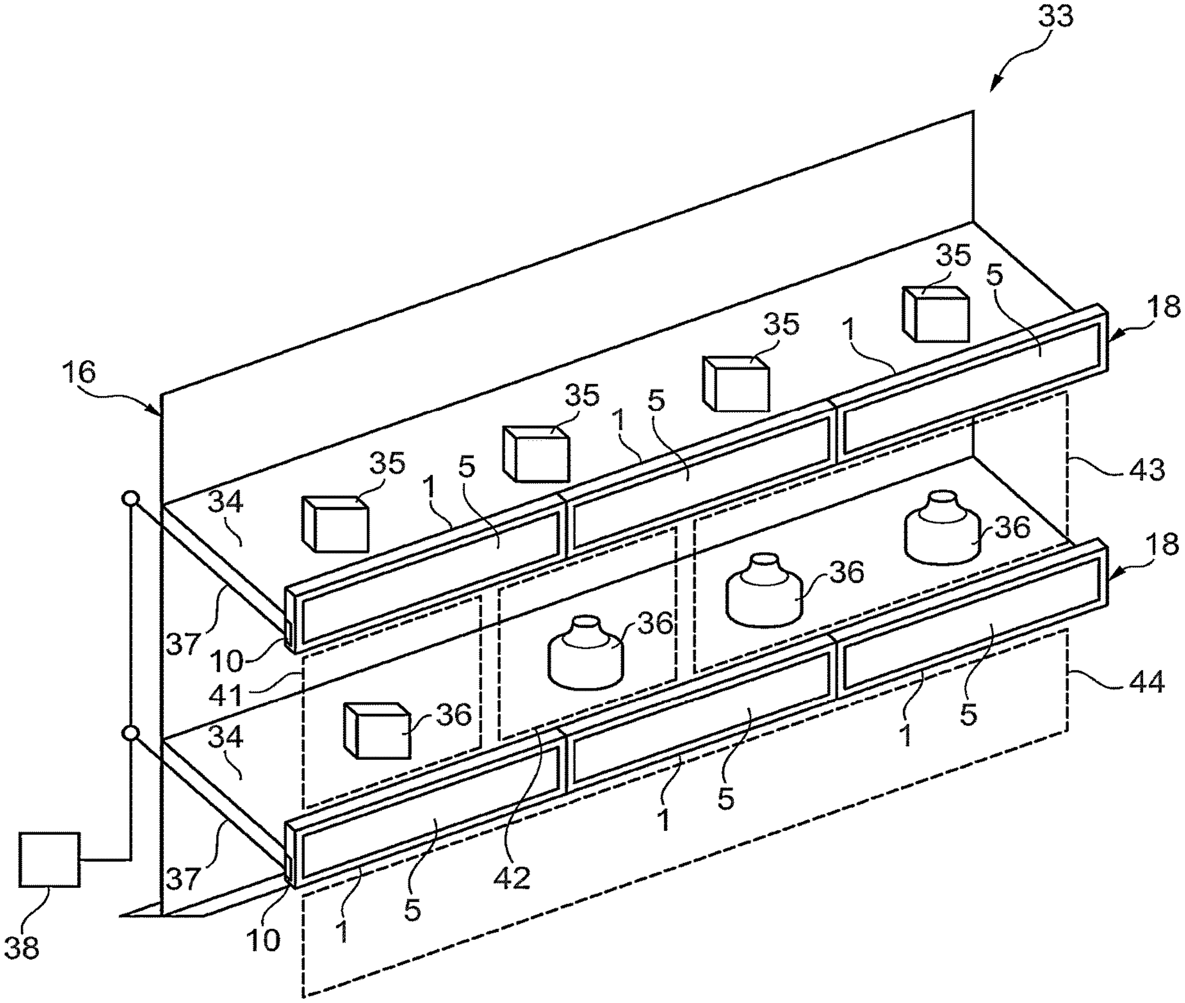
FIG. 6 a second embodiment of said merchandising system.

FIG. 6 now shows a further application of the ESLs 1. In this embodiment two shelf floors 34 are shown and three ESLs 1 per shelf floor 34 are attached horizontally next to each other. In total the ESL 1 define a 2×3 matrix of display screens 5. In this example of operation, it is assumed that one and the same film was distributed to each ESL 1. Each ESL 1 was than instructed by the distribution server 28 or any other (remote) control device (not shown) to playback only a section of the entire video image, which corresponds to its position in the 2×3 matrix. Playback is performed in synchronism with each other as explained above. The two groups of ESLs 1 aligned in a daisy-chain on each shelf floor 34 are now used to illuminate areas which are overlapping the individual positions or longitudinal extension of each ESL 1. In this example different rectangles 41-44 indicate illumination areas of individual light color and/or brightness.

Although not shown in detail it is mentioned that wires 37 are connected to each ESL 1.

Figure 7:
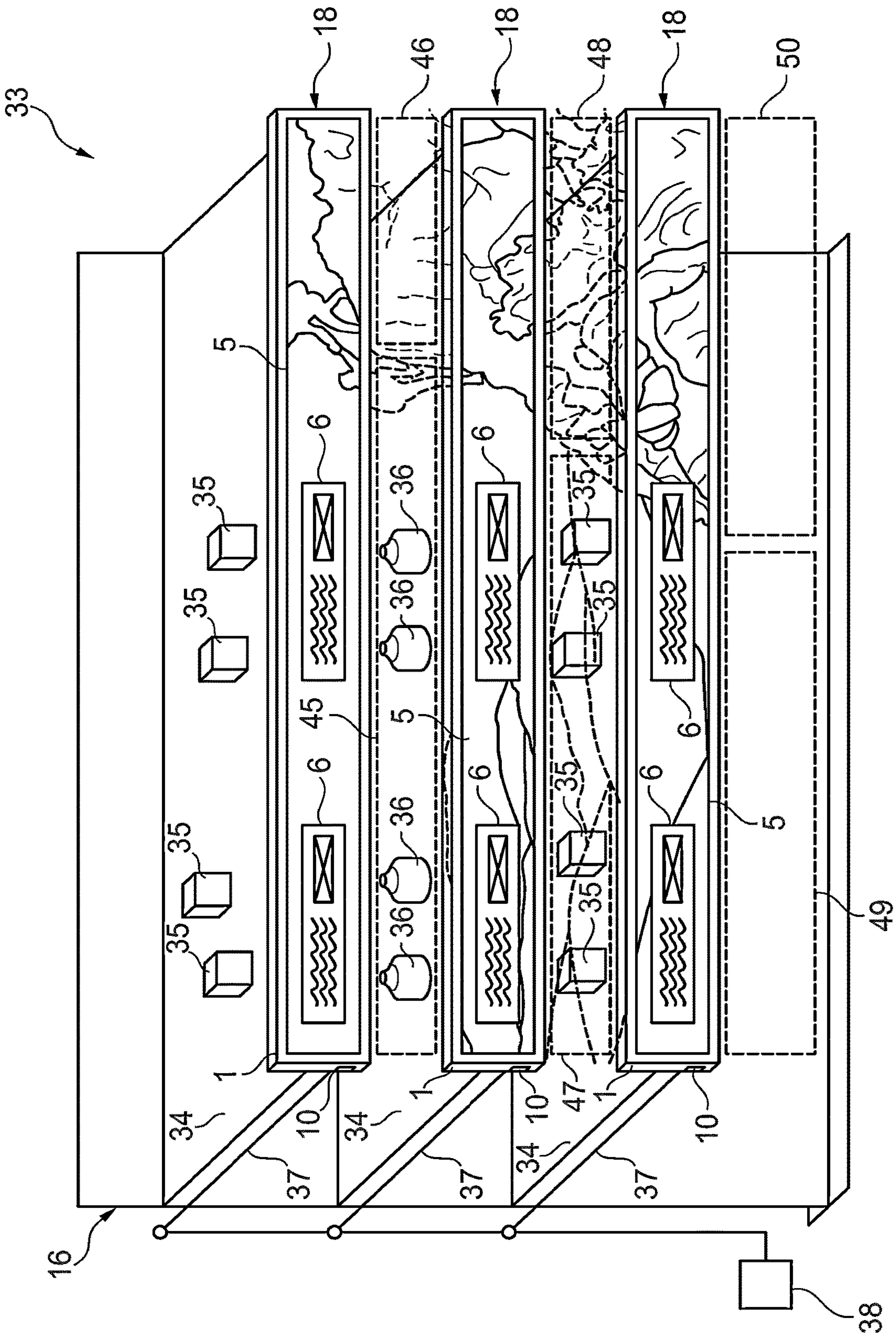
FIG. 7 a third embodiment of said merchandising system.

FIG. 7 shows a further embodiment in which the entire video image is split in sections, in the present case in horizontal sections with the suppression of intervening areas. For the sake of clarity is to mention that in FIG. 7 space between the ESLs 1 shows that part of the image that is not visible in reality but left in the FIG. 7 by means of broken lines so to give an impression of the entire image.

Hence, each ESL 1 plays back its individual pre-defined section (a stripe) of the entire video image. In this example a mountaineering video is played back and, in the moment shown, the video image of:

- the display screen 5 of upper most ESL 1 shows on its left side the blue sky and on the right side the top of the mountain with two climbers while the sun sets behind the peak of the mountain; the left picture content is dominated by a bright blue color tone while the right picture content is dominated by bright gray tones.
- the display screen 5 of the middle ESL 1 shows some mountains covered with forest in wider distance on its left side and rocks on its right side; the left picture content is dominated by light green color tones while the right part of the picture content is dominated by dark gray tones.
- the display screen 5 of the lower most ESL 1 shows some mountains covered with forest in the closer distance and rocks on its right side; the left picture content is dominated by dark green color tones while the right part of the picture content is dominated with very dark gray tones close to black.

In this embodiment the illumination-controller 32 of the upper most ESL 1 uses the radio-communication interface 27 to go into contact with the playback-controller 25 of the ESL 1 installed on the middle shelf floor 34. The illumination-controller 32 receives content-information therefrom, which are the color tone and brightness value, and processes it so to produce light by the illumination device 12 of the upper most ESL 1 that has a light green color tone in the left rectangle 45 and a dark gray tone in the right rectangle 46.

In analogy thereto, the illumination controller device 32 of the middle ESL 1 adjust the light produced by the illumination device 12 of the middle ESL 1 to emit light that has a dark green color tone on its left side (indicated by a rectangle 47) and a very dark gray tone close to black on its right side (indicated by a rectangle 48).

The lowest ESL 1 cannot acquire any content-information from an ESL arranged below itself because there is none. Therefore, its illumination-controller device 32 adjusts the light emitted by its illumination device 12 to show similar color tones and brightness values as the picture content displayed by its display screen 5 (see rectangle 49 and 50).

By the aid of this process, picture gaps between the shelf floors 34 are bridged, giving the observer the impression that the shelf reflects the whole picture and even expands the picture down to the ground floor. This effect works well for still image playback but is even more impressive during video playback when the light emitted by the illumination devices 12 dynamically changes as the video playback proceeds. This visually brings life to the shelf 16.

Finally, let it be noted once again that the figures described in detail above only involve exemplary embodiments, which the expert can modify in a wide variety of ways without departing from the area of the invention. For the sake of completeness, let it also be stated that use of the indeterminate article "a" or "an" does not mean that the respective features cannot be present multiple times.

The invention claimed is:

1. A method of using electronic shelf labels that are installed in a shop to mark a way towards a certain shelf, product, or emergency exit, the electronic shelf labels being attached to one or more shelves, each of the electronic shelf labels comprising:

a display screen arranged on or as a front wall of the electronic shelf label to display content in the form of a still or video image, the display screen comprising a light source to provide a backlight for the display screen, and an illumination device, which is independently controllable from the light source and configured to emit light from the electronic shelf label from a different wall from the front wall, wherein the method comprises switching on only ones of the illumination devices that are aligned in a row and indicate the way.

2. The method according to claim 1, wherein the switching on only ones of the illumination devices that are aligned in the row and indicate the way comprises consecutively switching on and off the illumination devices aligned in the row.

3. The method according to claim 1, wherein a group of flashing illumination devices or a group of glowing illumination devices at one point of the shop is used to highlight a section of a shelf or a whole shelf line.

4. The method according to claim 1, wherein the illumination devices mark the way to the emergency exit.

5. The method according to claim 1, wherein one or more shelf rails are located at a front edge of one or more shelf floors of the one or more shelves, and the electronic shelf labels are attached to the one or more shelf rails.

6. The method according to claim 1, wherein the electronic shelf labels form shelf rails that are each directly attached to a shelf floor of a corresponding one of the one or more shelves.

7. The method according to claim 1, wherein the illumination devices comprise the ones of the illumination devices that are aligned in the row and at least one other illumination device that is not aligned in the row.

8. A method of using electronic shelf labels that are installed in a shop to guide an employee of the shop to one or more shelves that needs action by the employee, the electronic shelf labels being attached to the one or more shelves, each of the electronic shelf labels comprising:

a display screen arranged on or as a front wall of the electronic shelf label to display content in the form of a still or video image, the display screen comprising a light source to provide a backlight for the display screen, and an illumination device, which is independently controllable from the light source and configured to emit light from the electronic shelf label from a different wall from the front wall, wherein the method comprises illuminating one or more positions on the one or more shelves:

which are empty and require filling, re-stocking, or both filling and re-stocking by an employee, or which are needed by the employee for preparing a shopping basket for a customer, or where there are expired products that need to be removed from the one or more shelves.

9. The method according to claim 8, wherein a special type of light is used which does not disturb the customer or is not recognizable to the customer.

10. The method according to claim 9, wherein the special type of light is a UV light or polarized light.

11. The method according to claim 9, wherein the special type of light is configured to be visible with the help of glasses or any other device to detect light that is not visible to the human eye.

12. The method according to claim 11, wherein the device is a smartphone or tablet computer, and the device comprises a light sensor and executes an application that guides the way by measuring, detecting, or both measuring and detecting the light via the light sensor.

13. The method according to claim 8, wherein one or more shelf rails are located at a front edge of one or more shelf floors of the one or more shelves, and the electronic shelf labels are attached to the one or more shelf rails.

14. The method according to claim 8, wherein the electronic shelf labels form shelf rails that are each directly attached to a shelf floor of a corresponding one of the one or more shelves.

15. The method according to claim 8, wherein the illuminating one or more positions on the one or more shelves is performed by the illumination device of one or more of the electronic shelf labels.

* * * * *